US009854401B1

(12) United States Patent
DeLuca et al.

(10) Patent No.: US 9,854,401 B1
(45) Date of Patent: Dec. 26, 2017

(54) SELECTIVE FILTERING OF MOBILE DEVICE MOVEMENT DATA

(71) Applicant: INTERNATIONAL BUSINESS MACHINES CORPORATION, Armonk, NY (US)

(72) Inventors: Lisa Seacat DeLuca, Baltimore, MD (US); Jeremy A. Greenberger, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/410,900

(22) Filed: Jan. 20, 2017

(51) Int. Cl.
| | |
|---|---|
| *H04W 24/00* | (2009.01) |
| *H04W 4/02* | (2009.01) |
| *H04M 1/725* | (2006.01) |
| *G06F 17/30* | (2006.01) |
| *G06Q 30/06* | (2012.01) |
| *H04W 4/04* | (2009.01) |

(52) U.S. Cl.
CPC ...... *H04W 4/023* (2013.01); *G06F 17/30241* (2013.01); *G06F 17/30946* (2013.01); *H04M 1/72572* (2013.01); *H04W 4/028* (2013.01); *G06Q 30/0613* (2013.01); *H04W 4/021* (2013.01); *H04W 4/043* (2013.01)

(58) Field of Classification Search
CPC ....... H04W 24/02; H04W 4/02; H04W 4/021; H04W 4/023; H04W 4/027; H04W 4/04; H04W 4/08
See application file for complete search history.

(56) References Cited

U.S. PATENT DOCUMENTS

| | | | |
|---|---|---|---|
| 9,185,101 B2 * | 11/2015 | Grigg | ...................... H04L 63/08 |
| 2011/0276440 A1 | 11/2011 | Collins et al. | |
| 2013/0012235 A1 | 1/2013 | Burdo et al. | |

(Continued)

FOREIGN PATENT DOCUMENTS

WO   WO 2010/126450 A2   11/2010

OTHER PUBLICATIONS http://www.floorplanlive.com/#floorplanlivedata, printed Jan. 20, 2017 (4 pages).

(Continued)

*Primary Examiner* — Khalid Shaheed
(74) *Attorney, Agent, or Firm* — Michael A. Petrocelli, Esq.; Kevin P. Radigan, Esq.; Heslin, Rothenberg, Farley & Mesiti (57) ABSTRACT

Processes for searching and identifying mobile devices of interest are provided based, at least in part, on movement of the multiple mobile devices. The process includes, for instance, obtaining movement data of multiple mobile devices, and receiving a specified movement pattern of interest. The movement data of the multiple mobile devices is compared against the specified movement pattern of interest, and based on the comparing, a data structure is generated at least identifying one or more mobile devices of the multiple mobile devices with a movement data closest to the specified movement pattern of interest. In enhanced embodiments, the movement pattern of interest may be a user-specified travel path or a user-specified pattern of zone movements, for instance, within a venue or within a geographic region.

14 Claims, 7 Drawing Sheets

(56) References Cited

U.S. PATENT DOCUMENTS

| | | | |
|---|---|---|---|
| 2013/0059608 A1* | 3/2013 | Cuff | H04W 64/006 455/456.5 |
| 2013/0109412 A1 | 5/2013 | Nguyen et al. | |
| 2013/0317944 A1 | 11/2013 | Huang et al. | |
| 2015/0181549 A1 | 6/2015 | Batada et al. | |
| 2016/0021511 A1 | 1/2016 | Jin et al. | |
| 2016/0026779 A1* | 1/2016 | Grigg | G06F 21/31 726/4 |
| 2016/0073229 A1* | 3/2016 | Haro | H04W 4/021 455/456.3 |
| 2016/0192130 A1 | 6/2016 | Kahn et al. | |
| 2017/0161342 A1* | 6/2017 | Suzuki | G06F 17/30554 |

OTHER PUBLICATIONS

International Business Machines Corporation (IBM), "z/Architecture Principles of Operation," IBM® Publication No. SA22-7832-10, Eleventh Edition, Mar. 2015, pp. 1-1732.

International Business Machines Corporation (IBM), "Power ISA ™ Version 2.07B," International Business Machines Corporation, Apr. 9, 2015, pp. 1-1527.

* cited by examiner

SELECTIVE FILTERING OF MOBILE DEVICE MOVEMENT DATA

BACKGROUND

There currently exist a variety of portable computing devices (i.e., mobile devices), including wireless computing devices, such as mobile telephones, personal digital assistance (PDAs), tablets, laptop computers, wireless computers, etc., which are small, lightweight and easily carried by users. These mobile devices (including cellular phones, internet protocol (IP) telephones, smartphone devices, etc.) can communicate audio and data packets over wireless networks. In addition, mobile devices may possess facilities which allow for the tracking of the devices. For instance, various technologies are now available for mid-range tracking of a mobile device within a venue, such as via beacons, as well as geographically tracking a mobile device, such as by using geo-fencing, the Global Positioning System (GPS), etc.

SUMMARY

Certain shortcomings of the prior art are overcome and additional advantages are provided through the provision of a computer-implemented method which includes: obtaining movement data of multiple mobile devices, and receiving a specified movement pattern of interest. The computer-implemented method further includes comparing the movement data of the multiple mobile devices against the specified movement pattern of interest, and based on the comparing, generating a data structure at least identifying one or more mobile devices of the multiple mobile devices with movement data closest to the specified movement pattern of interest.

In another aspect, a system is provided which includes a memory, and a processing unit communicatively coupled to the memory. The system performs a method, which includes: obtaining movement data of multiple mobile devices, and receiving a specified movement pattern of interest. The method further includes comparing the movement data of the multiple mobile devices against the specified movement pattern of interest, and based on the comparing, generating a data structure at least identifying one or more mobile devices of the multiple mobile devices with movement data closest to the specified movement pattern of interest.

In a further aspect, a computer program product is provided for filtering mobile device movement data. The computer program product includes a computer readable storage medium having computer readable program code embodied therewith, which is executable by a processor to perform a method, including: obtaining movement data of multiple mobile devices, and receiving a specified movement pattern of interest. The method further includes comparing the movement data of the multiple mobile devices against the specified movement pattern of interest, and based on the comparing, generating a data structure at least identifying one or more mobile devices of the multiple mobile devices with movement data closest to the specified movement pattern of interest.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

The description that follows includes exemplary devices, systems, methods, techniques and instruction sequences that embodies techniques of the present invention. However, it should be understood that the described invention may be practiced, in one or more aspects, without the specified details. In other instances, while known protocols, structures and techniques have no not been shown in detail in order not to obscure the invention. Those of ordinary skill in the art will appreciate that the described techniques and mechanisms may be applied to various systems to facilitate filtering mobile device movement data, in accordance with one or more aspects of the present invention.

In general, a mobile device such as discussed herein is indicative or inclusive of various types of devices, such as a wireless phone, a cellular phone, a laptop computer, a wireless multimedia device, a tablet, a wireless communication personal computer (PC), a PDA, etc. Any mobile device such as referenced herein may have memory for storing instructions and data, as well as hardware, software, and firmware, and combinations thereof. As is well known, the mobile devices can receive audio and/or video data packets over wireless networks, with notifications, such as advertisements, coupons, etc., being one example of data capable of being received by mobile devices.

Indoor mobile device location services are available which allow for mobile devices to be tracked inside of a venue. For instance, as each mobile device enters a venue, a record may be saved with the mobile device's visit information including, for instance, time of day, travel path through the venue and dwell times within the venue. In a potentially large venue, such as a retail store, a stadium, an office building, etc., hundreds if not thousands of mobile devices may be tracked at any given moment. With so many mobile devices potentially being tracked, finding a desired subset or collection of mobile devices that meet certain criteria, for instance, for management or advertising purposes, can be a daunting task. Disclosed herein therefore, in one or more aspects, is processing to identifying particular mobile devices of interest based on collected movement data of the mobile devices, for instance, within the venue, or more broadly, within any geographic area of interest.

By way of example, a "venue" may include any location that may be configured with, for instance, zones using short-distance wireless device location detection technology (e.g., Bluetooth™ Low Energy (BLE), or other hot spot beacons, triangulation, proximity, etc.), such as a sports arena, a store, office, shopping mall, food court, or other indoor or outdoor geographic area where people may gather and move among different locations within the area. A venue "zone" may include any area or region of a venue, such as a food court/cafeteria, a section of a store, a region of a shopping mall, or sports stadium, or other area/region that may be configured with short-distance wireless device location detection technology to detect movement among and within the respective areas or regions, as well as, for instance, the amount of time a mobile device user may dwell within a particular area or region. In this context, a venue "zone event" may refer to detection of a mobile device, and thereby the respective user carrying the mobile device, entering, moving within, dwelling at a location within, or leaving a particular venue zone.

Multiple different forms of zone events may be configured as granularly as appropriate for a particular zone, according to size and other factors relating to the particular zone (e.g., number and proximity of shelving or display units, etc.). The terms "dwell" and "dwell time" may refer to a user of a mobile device being detected as remaining in a particular location or zone for a particular duration of time.

In one or more implementations, multiple mobile devices within a venue may be tracked, with zone events occurring that represent relative movements and dwell times of the multiple mobile devices within the venue as users of the mobile devices move and dwell among multiple configured zones of the venue. This information may then be collected and stored as movement data of the multiple mobile devices within the venue. In association with this data, time-related information, such as dwell times, times of day within the venue, may also be stored for the mobile devices.

By way of example, movement and dwell times may be stored for mobile device users as they enter, exit, and remain within one or more venues and/or zones within a venue, to determine how long different users stand (e.g., dwell/remain/stay) in certain areas of the venue, and the respective user's movement pattern within the venue. It should also be noted in this discussion that the owners of the mobile device's may be provided with an opportunity to "opt in" to or "opt out" from the location tracking technology described herein.

Generally stated, provided herein are a computer-implemented method, system and computer program product for searching or tracking mobile device data based on a specified movement or path of interest and comparing the specified path and the actual movements of the mobile devices. The process may include defining a specified movement of interest, or a specified sequence of zone movements, and analyzing a plurality of mobile device movements within a predetermined vicinity of the specified path of interest. The analysis may include retrieving movement data (and times of movement) of mobile devices, and comparing the actual movement paths of the mobile devices with the specified path to filter or otherwise analyze movement of the devices (and thus the movement of the people possessing the devices) relative to the specified path of interest.

Figure 1:
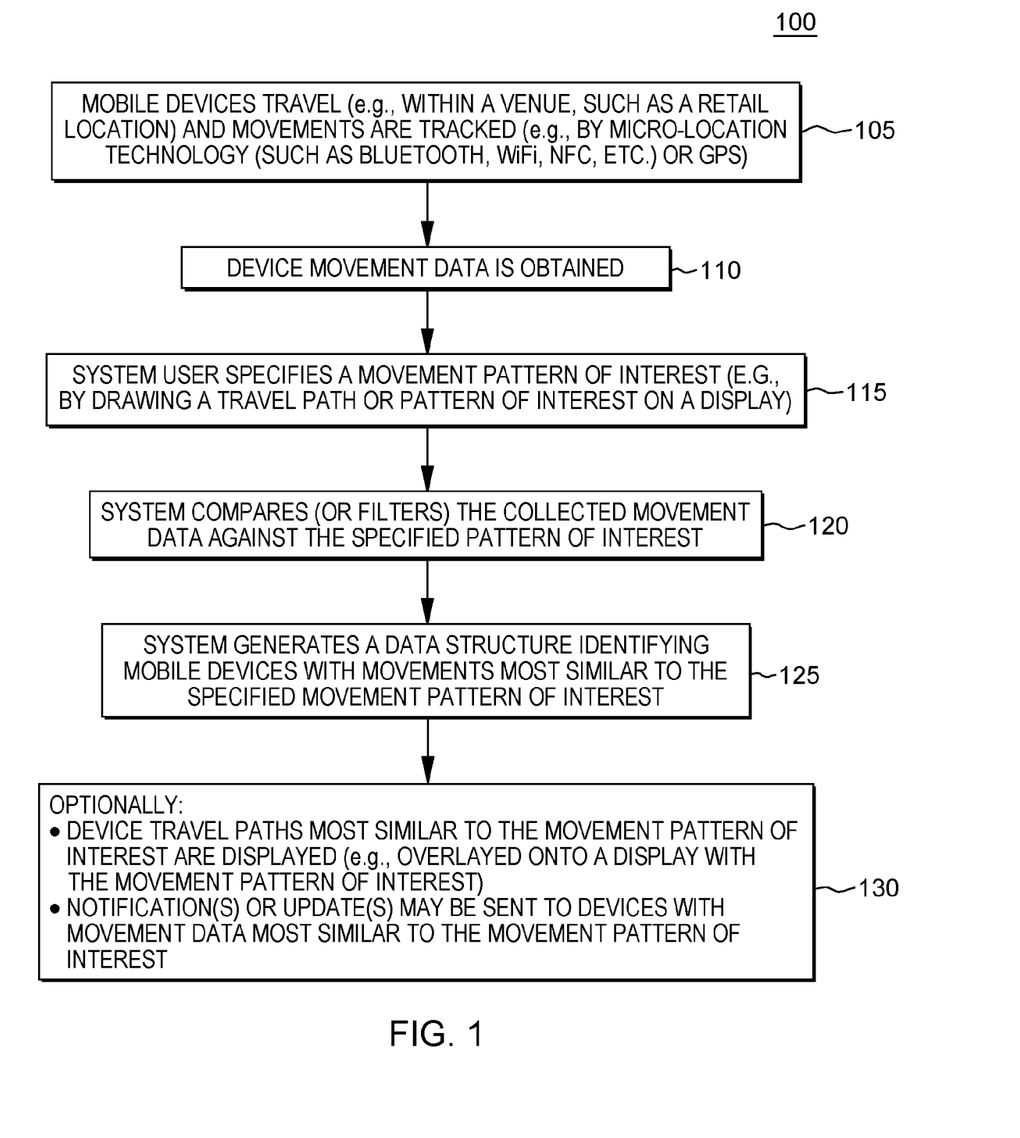
FIG. 1 depicts one embodiment of processing to selectively filter mobile device movement data, in accordance with one or more aspects of present invention.

FIG. 1 depicts one embodiment of pattern-based processing of mobile device movement data, in accordance with one or more aspect of the present invention. Referring to FIG. 1, process 100 includes monitoring mobile devices traveling, for instance, within a venue, with device movement throughout the venue being tracked, for instance, using microlocation technology such as Bluetooth, Wi-Fi, near field communication (NFC), etc. 105. As also explained herein, the tracking of the mobile devices may additionally, or alternatively, be geographic-based tracking that is, tracking not within a particular indoor venue. For instance, the tracking could be tracking travel paths taken by mobile devices within a city, or between cities, or even between states or countries.

Movement data of multiple mobile devices is collected 110, and this may include storing the data for subsequent analysis and parsing as described herein. Further, the collecting may include collecting time-related information such as times of day, days of the week, dwell times, etc., of the mobile devices within the venue, or within particular zones of the venue, or within different regions or areas of a geography being monitored.

A user of the system (such as an operator or administrator) specifies or identifies a movement pattern of interest 115. For instance, the system may include a display of a venue or a geographic region of interest and the user may specify a movement path by interactively drawing a desired travel path or pattern of interest on the screen.

The system compares (or filters) the collected movement data of the multiple mobile devices against the specified movement pattern of interest 120.

Based upon the comparing, the system generates a data structure at least identifying devices with movement data most similar to or matching the specified pattern of interest 125. In one or more implementations, the data structure may be a comparative table which provides feedback on mobile device movement (i.e., visitor movement) within the venue or geographic area relative to the specified travel pattern of interest. Optionally, the system may identify devices with movement data most similar to the movement pattern of interest (e.g., within a set tolerance) and display those travel paths, for example, by displaying the selected paths on a display including the specified movement pattern of interest 130. Further, the system may provide notifications and/or updates, etc., to mobile devices with movement data matching or most similar to the specified pattern of interest 135, if desired.

Figure 2A:
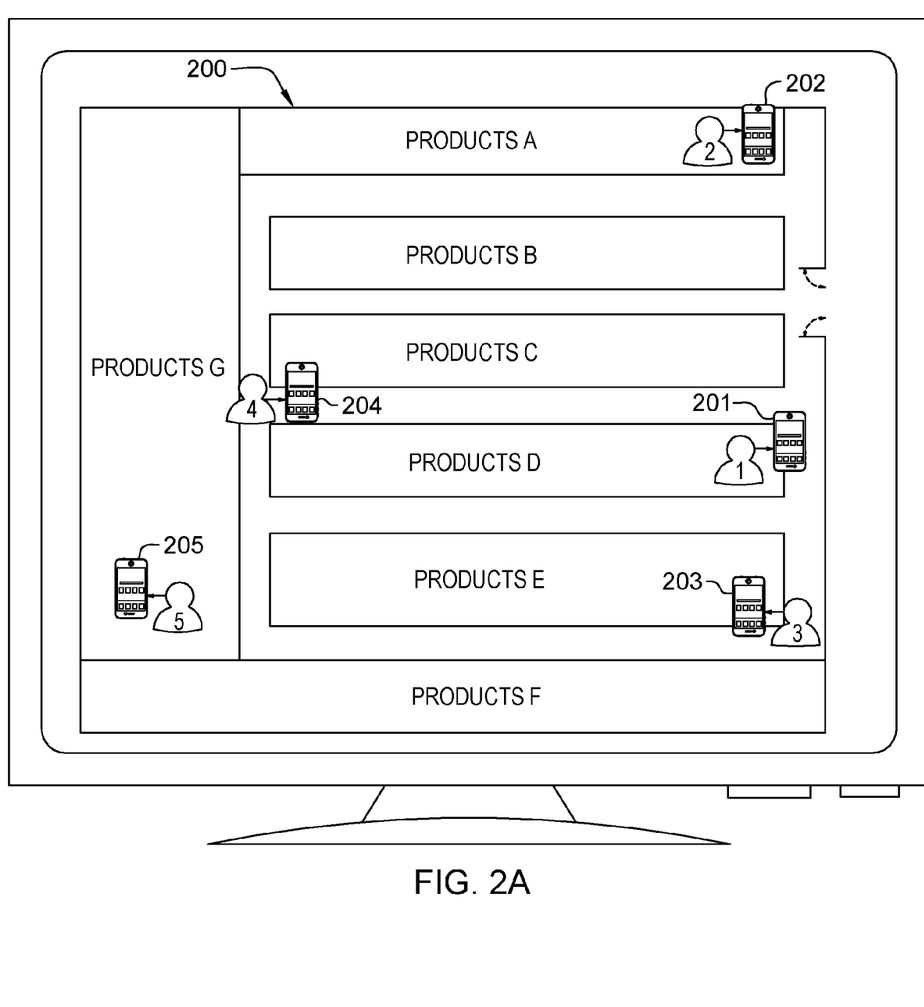
FIG. 2A is a system display of one example of a venue where movements of multiple mobile devices within the venue may be obtained for filtering, in accordance with one or more aspects of present invention.
Figure 2B:
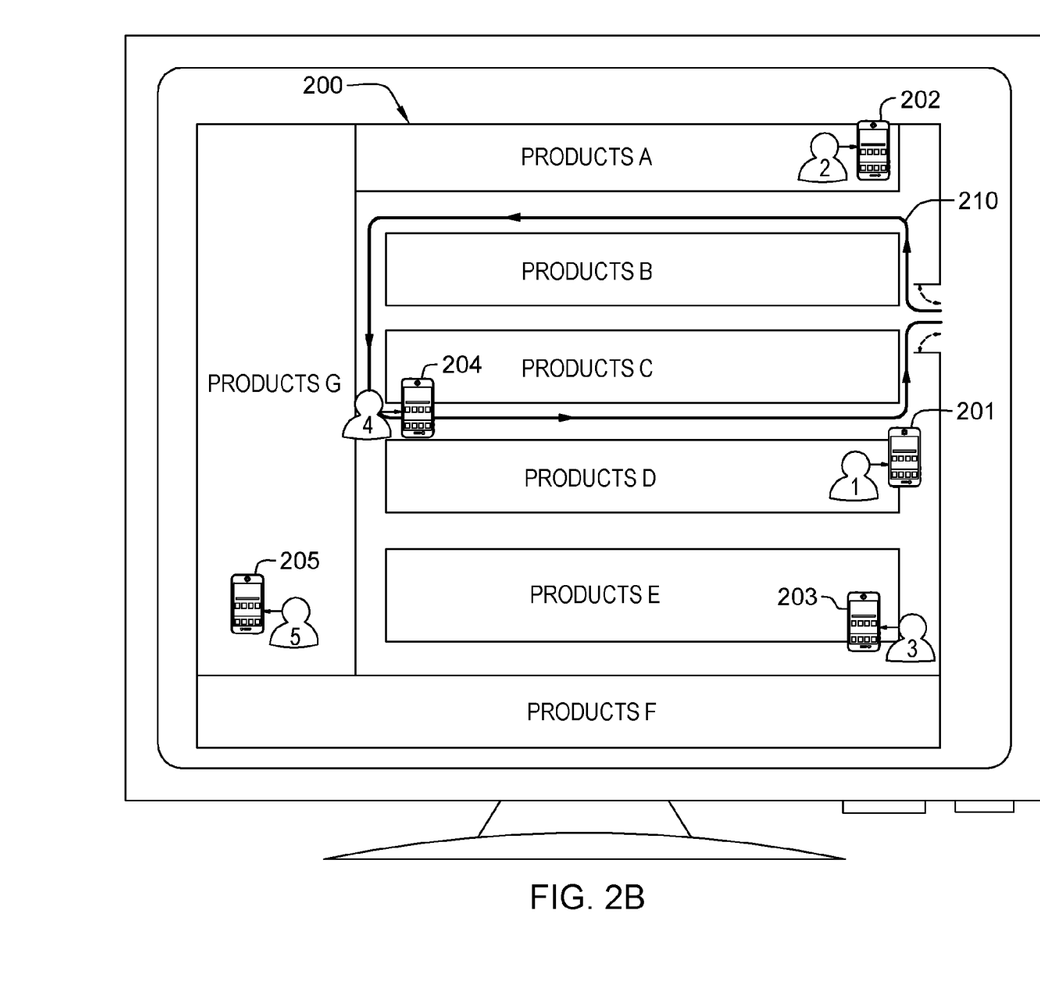
FIG. 2B depicts the system display of FIG. 2A with a specified movement pattern of interest shown provided, for instance, by a user of the system, in accordance with one or more aspects of present invention.

By way of example, FIGS. 2A and 2B depict a system display 200 of a venue with location of multiple mobile devices 201, 202, 203, 204, 205 of visitors 1-5 shown within display 200. In this example, the display may be associated with a system implementing processing such as described herein. As a specific example, Table 1 shows one embodiment of collected data for mobile devices 201-205 within the venue.

TABLE 1

| Device Identifier | Movement Data | Time of Day | Dwell Time | Device Contact Info |
|---|---|---|---|---|
| 201 | — | — | — | — |
| 202 | — | — | — | — |

TABLE 1-continued

| Device Identifier | Movement Data | Time of Day | Dwell Time | Device Contact Info |
|---|---|---|---|---|
| 203 | — | — | — | — |
| 204 | — | — | — | — |
| 205 | — | — | — | — |

Note that the structure of Table 1 is presented by way of example only. In Table 1, a device identifier 201-205 of the various mobile devices within the venue is listed, as well as movement data, which one or more embodiments may identify a particular travel path or pattern of the identified mobile device within the venue. Also, in one more implementations, the time of day, as well as various dwell times may be recorded, along with device contact information. The device contact information would allow the system to, for instance, send a notification or update to the particular identified device when selected.

In FIG. 2B, a user specified movement pattern of interest 210 is shown within system display 200. In one or more implementations, the user may specify the pattern 210 by interactively drawing the pattern of interest onto a touch screen display 200. In the example illustrated, the user may be looking to filter for any mobile devices that have entered the venue, passed between products A zone and products B zone, move down the main isle in front of products G zone, before passing between the products C zone and product D zone, and exiting the venue. Based on this example, mobile devices 204, 201, and 202 are identified as currently most similar to the pattern of interest 210. Thus, when the system compares the movement data of the multiple mobile devices against the specified movement pattern of interest, a data structure such as depicted in Table 2 may be obtained, where the movement pattern of visitors 1, 2, and 4 (owning devices 201, 202, and 204) within the venue are found to be closest to the specified movement pattern of interest in 210, and the non-matching data of visitors 3 and 5 (owning devices 203 & 205) is omitted.

TABLE 2

| Device Identifier | Movement Data | Time of Day | Dwell Time | Device Contact Info |
|---|---|---|---|---|
| 204 | — | — | — | — |
| 201 | — | — | — | — |
| 202 | — | — | — | — |

Also, note in this example that the data structure generated (e.g., Table 2) may prioritize the mobile devices based upon their respective movement data. In this example, movement of mobile device 204 is found to be closest to the user specified movement pattern of interest, and thus is identified first in the data structure. Similarly, movement of mobile device 201 is found to have the second closest movement through the venue to the user specified pattern of interest, and is thus identified second in the data structure. Further, note that mobile devices 203 and 205 may be filtered from inclusion within the generated data structure (e.g. Table 2), since they are found to be not relevant to the user specified movement pattern of interest within the venue.

Note that in an alternative embodiment, rather that defining a specific path through a venue, a pattern of zone movements within a venue could be provided. For instance, the user may specify that the pattern processing should be looking to identify those individuals (via their mobile devices) who have traveled into the venue to products A zone, then moved to products D zone before exiting the store. Further, variations on this approach, as well as a specified path approach, are possible. For instance, a user of the system may further qualify the specified path, or pattern of movements, with desired dwell times at one or more zones or areas. For example, the user may be interested in mobile devices that dwell within the products A zone at least 10 minutes, before moving onto the products D zone. Other time qualified patterns will be apparent to those skilled in the art based upon the discussion provided herein.

Advantageously, a method of searching tracked device information based on a specified path, and comparing the specified path with actual paths taken by mobile devices within a venue or geographical area is provided which includes: defining a specified movement pattern or zone pattern within a venue or geographic area; analyzing multiple mobile device movements within a set tolerance (e.g., within a predetermined vicinity) of the specified pattern, the analyzing including considering locations and times to determine an actual path of the mobile device within the venue, (where visitor movements are assumed based upon the travel of the respective mobile devices); accessing a collection of movement paths or patterns of the mobile devices from the analyzed mobile devices movements; comparing the movement patterns of the mobile devices with the specified pattern; and generating a data structure, such as a comparative table, of the visitor movement patterns closest to the specified pattern. If desired, a venue or geographic area map may be displayed with the specified pattern to illustrate variations of actual paths of visitors from the specified pattern, with the matching or closest collected movement data also being displayed. As noted, in one or more embodiments, the method may include defining zones within a venue and determining which zones a mobile devices enters and exits as well as the paths through the zones. Mobile device movement within a zone or geographic area may be determined using various available sensing hardware, such as beacon hardware positioned within a venue, in association with an uploaded floor plan of the venue for a user or operator to specify a particular movement data of interest by which to compare the movement data of the mobile devices.

Figure 3:
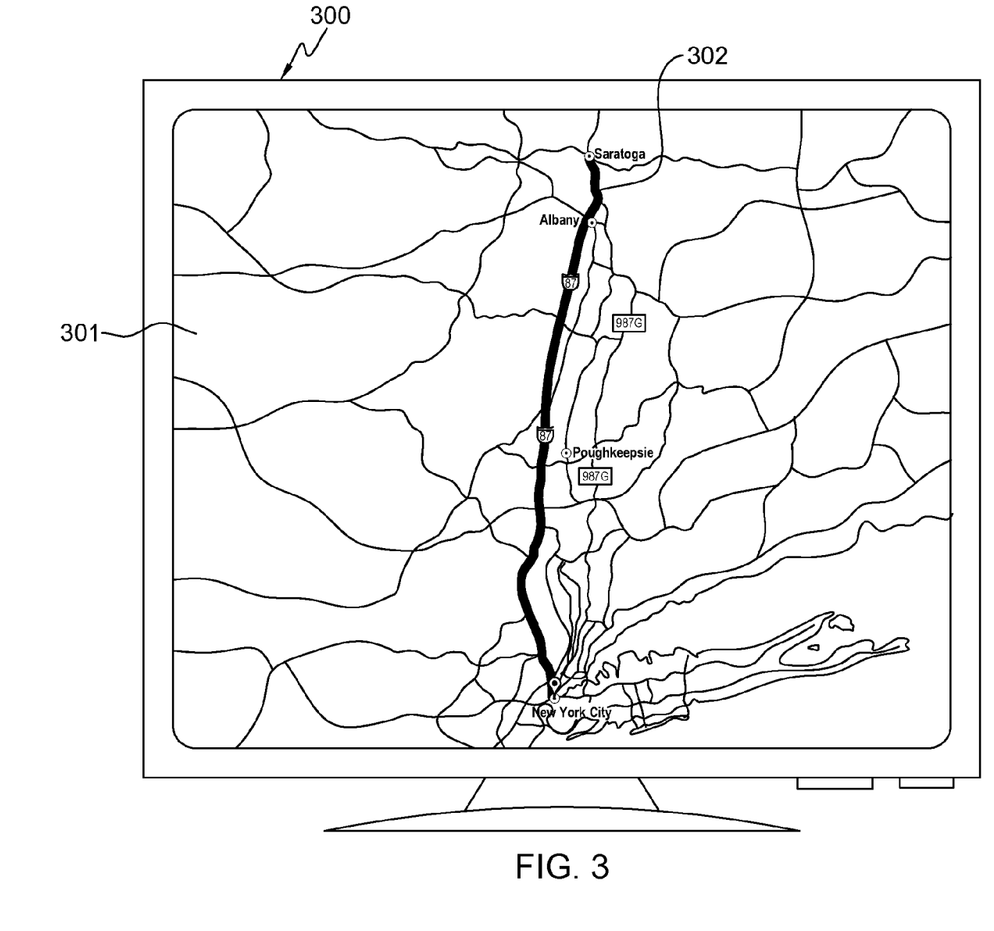
FIG. 3 is another system display of a specified movement pattern of interest within a geographic region for use in comparing against obtained movement data of multiple mobile devices, in accordance with one or more aspects of present invention.

FIG. 3 depicts a further example of a system display 300 of a system implementing, in one or more aspects, processing such as described herein. In this example, the processing collects travel path data of multiple mobile devices traveling a geographic distance, for instance, between cities in upstate New York, such as illustrated in displayed map 301. The tracking of the mobile devices may employ any available technology, such as GPS tracking. Additionally, the system receives a user specified movement pattern of interest 302, which in the display 300 is shown to be a travel pattern between Saratoga Springs, N.Y. and New York City through Albany, N.Y. The system compares collected travel path data of multiple mobile devices (not shown) against the specified travel pattern of interest 302. Note that the comparing may include, in part, comparing an origin location and destination location of the mobile device to the specified travel pattern of interest. This might be in addition to the particular path or roads taken in traveling between the origin and destination locations. Based on the comparing, the system generates a data structure which, in one or more embodiments, at least identifies one or more mobile devices of the multiple mobile devices with the collected travel path data closest to the specified travel path of interest. For instance, in one or more embodiments, the collected travel path may match the specified travel path of interest, in another case, the collected travel path data may be within a set tolerance to the specified travel pattern of interest. In this way, a user of the system is able to filter mobile devices that meet a specified set of criteria. As with other examples described herein, the user specified movement pattern of interest could be further qualified with time-related information, such as the day of the week the mobile devices traveled, the times of the day the mobile devices traveled, the amount of times the mobile devices spent traveling between the origin and destination locations, etc.

As another example, a venue operator might set up a mobile device tracking system which includes sensing hardware and may upload a floor plan to the system. Visitors with their mobile devices would move around the venue creating travel path data which is collected on the multiple mobile devices. A venue operator logs onto the system through an appropriate user interface, which is noted above, may include a display screen, and a table of all mobile devices tracked within the venue may be obtained or shown. In one or more embodiments, the mobile devices may be shown dynamically for users currently in the venue, or historical information may be retrieved, for instance, showing all mobile devices within a venue on a particular day of the week. Note that these are examples only, and that other implementations are also possible.

An option to display the venue floor plan may appear, or the floor plan could simply be uploaded for the user's viewing. In one or more embodiments, the user may draw a path on the floor plan image being displayed to interactively input a specified travel pattern of interest to focus the system to filter for desired visitors, (or more particularly, mobile devices) that the user would look to target. Optionally, the user could also select a particular time or date range for the specified travel pattern of interest. Further, the user could alternatively create a zone pattern of interest by, for instance, tapping zone A, then zone B, then back to zone A. The collected travel path data is retrieved and compared against the specified travel pattern of interest. The mobile devices with matching or closest pattern data are identified and a data structure may be generated with the results. Optionally, the data structure results may be organized on a most similar travel path to a least similar travel path, as well as indicating a matching score. For instance, 75% match, 95% match, etc. Further, the system may optionally allow eliminating mobile devices that do not match the specified pattern of interest by a certain amount. For instance, mobile devices with travel paths that do not match by at least 60% might be eliminated from inclusion within the generated data structure. In one or more embodiments, the selected mobile devices with the closest travel paths to the specified travel pattern of interest may be displayed within the system display for user viewing as well.

The filtering described herein, may advantageously be used to target certain mobile devices for notifications, such as advertising coupons, or updates, such as application or other software updates to the mobile device. Further, the filter may be advantageous when viewing graphs or charts on mobile devices (and thus visitors) for analytics purposes, or when otherwise tagging the mobile devices with certain labels for business or other administrative purposes.

In one or more implementations, the concepts disclosed herein may be used to present a venue operator with the option to specify a matching threshold that allows for deviation from a specified movement pattern of interest. In addition, this value could be adjustable within the system, displaying more and more mobile devices and their associated travel paths as the percent match is lowered. The processing disclosed herein may also be zone based, in one or more implementations. Rather than requiring a mobile device to have traveled a specific path, the system can allow the operator to select particular zones or a pattern of zones of interest in order to identify mobile devices traveling within a venue between different zones in a particular pattern. In this way a subset of the overall mobile devices tracked within a venue may be readily ascertained which have the same or similar movement actions to the specified pattern. For instance, a user may input a pattern of enter shoe department, exit shoe department, enter men's clothing department, exit men's clothing department. In this way, the particular route through the venue may be broaden.

Those skilled in the art will note from the above discussion that provided herein is an adaptable process for selectively filtering mobile device movement data, for instance, from within a venue or geographical area. Using the processing described, a system user can have more efficient search options with a more efficient user interface. As noted, using the filtering described, particular mobile devices may be targeted for notifications, such as advertisements, in a more efficient manner.

As an extension, along with mobile device filtering, processing may be provided for identifying individuals owning the mobile devices of interest, as well as any other mobile devices owned by those individuals. For instance, one or more databases may be accessed to facilitate identifying the owner of a particular mobile device, as well as any other mobile devices owned by that person, irrespective of whether those other devices are part of the obtained movement data. Further, the system might allow pattern matching against all people that go, for instance, to places x, y, and z. Since a person may have one or more mobile devices, a rule could be set indicating that N number of the devices that belong to the person, along with the matching movement pattern of interest, which would need to be present to satisfy a particular filtering mechanism. Such extended processing could be advantageously used for certain marketing or advertising purposes.

Exemplary embodiments of a computing environment to implement one or more aspects of the present invention are described below with reference to FIGS. 4-6.

Figure 4:
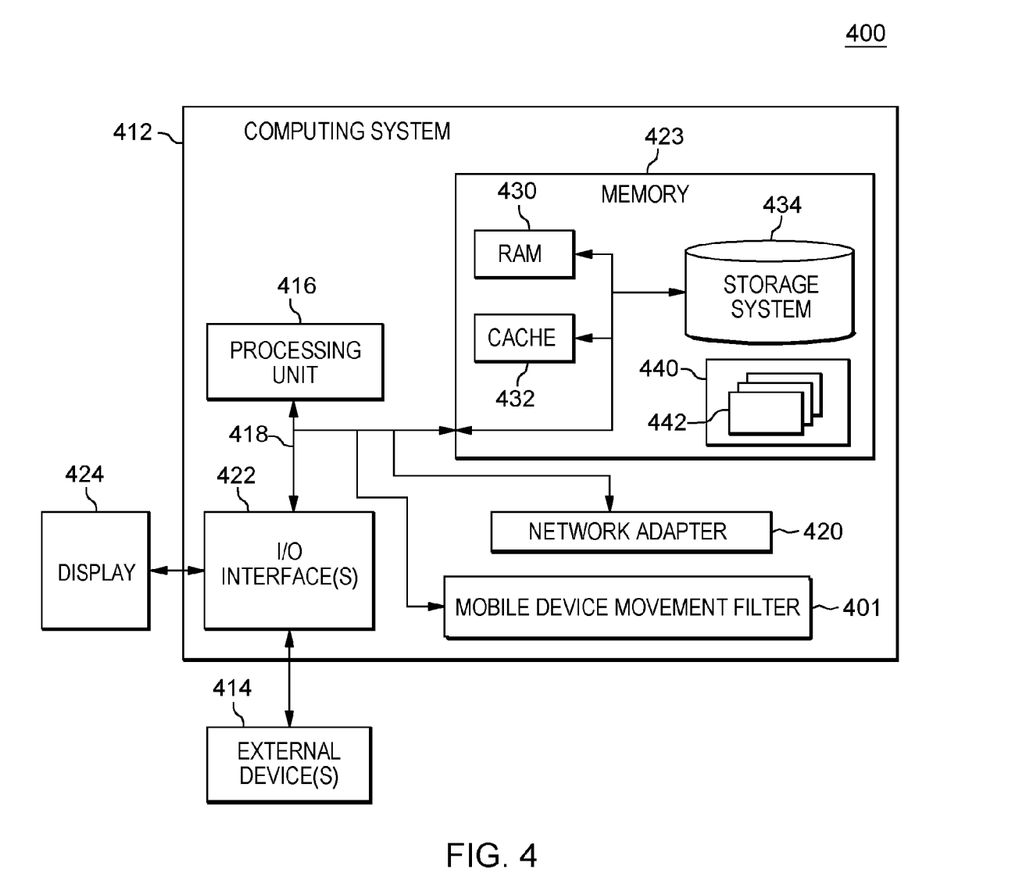
FIG. 4 depicts one embodiment of a computing system which may implement or facilitate implementing processing for filtering mobile device movement data, in accordance with one or more aspects of the present invention.

By way of further example, FIG. 4 depicts one embodiment of a computing environment 400, which includes a computing system 412. Examples of well-known computing systems, environments, and/or configurations that may be suitable for use with computer system 412 include, but are not limited to, a server, a desktop computer, a work station, a wireless computer, a handheld or laptop computer or device, a mobile phone, a programmable consumer electronic device, a tablet, a personal digital assistant (PDA), and the like.

Computing system 412 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 4, computing system 412, is shown in the form of a general-purpose computing device. The components of computing system 412 may include, but are not limited to, one or more processors or processing units 416, a system memory 423, and a bus 418 that couples various system components including system memory 423 to processor 416.

In one embodiment, processor 416 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 412 may include a variety of computer system readable media. Such media may be any available media that is accessible by computing system 412, and it includes both volatile and non-volatile media, removable and non-removable media.

System memory 423 can include computer system readable media in the form of volatile memory, such as random access memory (RAM) 430 and/or cache memory 432. Computing system 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 418 by one or more data media interfaces. As described below, memory 423 may include at least one program product having a set (e.g., at least one) of program modules that are configured to carry out the functions of embodiments of the invention.

Program/utility 440, having a set (at least one) of program modules 442, may be stored in memory 432 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein. Alternatively, a separate, mobile device movement filtering system, module, logic, etc., 401 may be provided within computing environment 412.

Computing system 412 may also communicate with one or more external devices 414 such as a keyboard, a pointing device, a display 424, etc.; one or more devices that enable a user to interact with computing system 412; and/or any devices (e.g., network card, modem, etc.) that enable computing system 412 to communicate with one or more other computing devices. Such communication can occur via Input/Output (I/O) interfaces 422. Still yet, computing system 412 can communicate with one or more networks such as a local area network (LAN), a general wide area network (WAN), and/or a public network (e.g., the Internet) via network adapter 420. As depicted, network adapter 420 communicates with the other components of computing system, 412, via bus 418. It should be understood that although not shown, other hardware and/or software components could be used in conjunction with computing system 412. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 4. Computer system/server 412 of FIG. 4 may be practiced in distributed cloud computing environments where tasks are performed by remote processing devices that are linked through a communications network. In a distributed cloud computing environment, program modules may be located in both local and remote computer system storage media including memory storage devices. Computer system/server 612 is capable of being implemented and/or performing any of the functionality set forth hereinabove.

Figure 5:
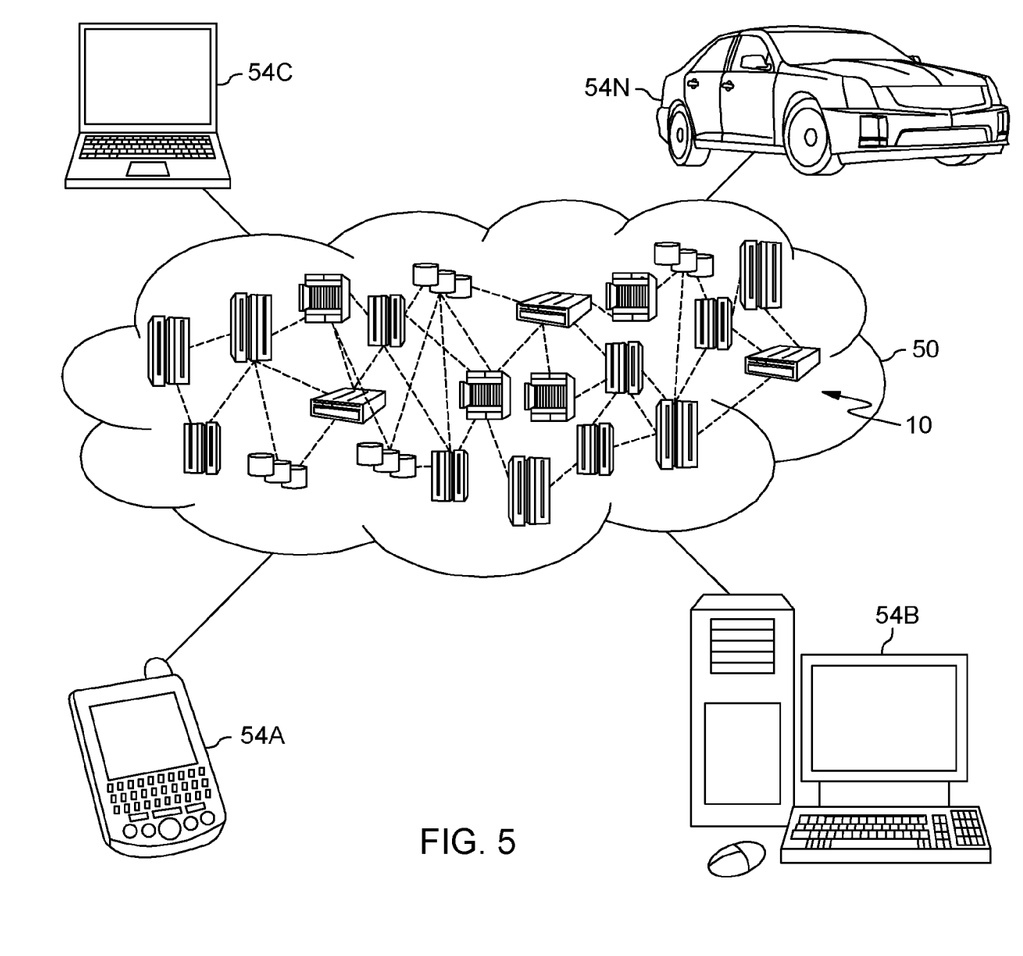
FIG. 5 depicts one embodiment of a cloud computing environment, which may facilitate implementing, or be used in association with one or more aspects of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
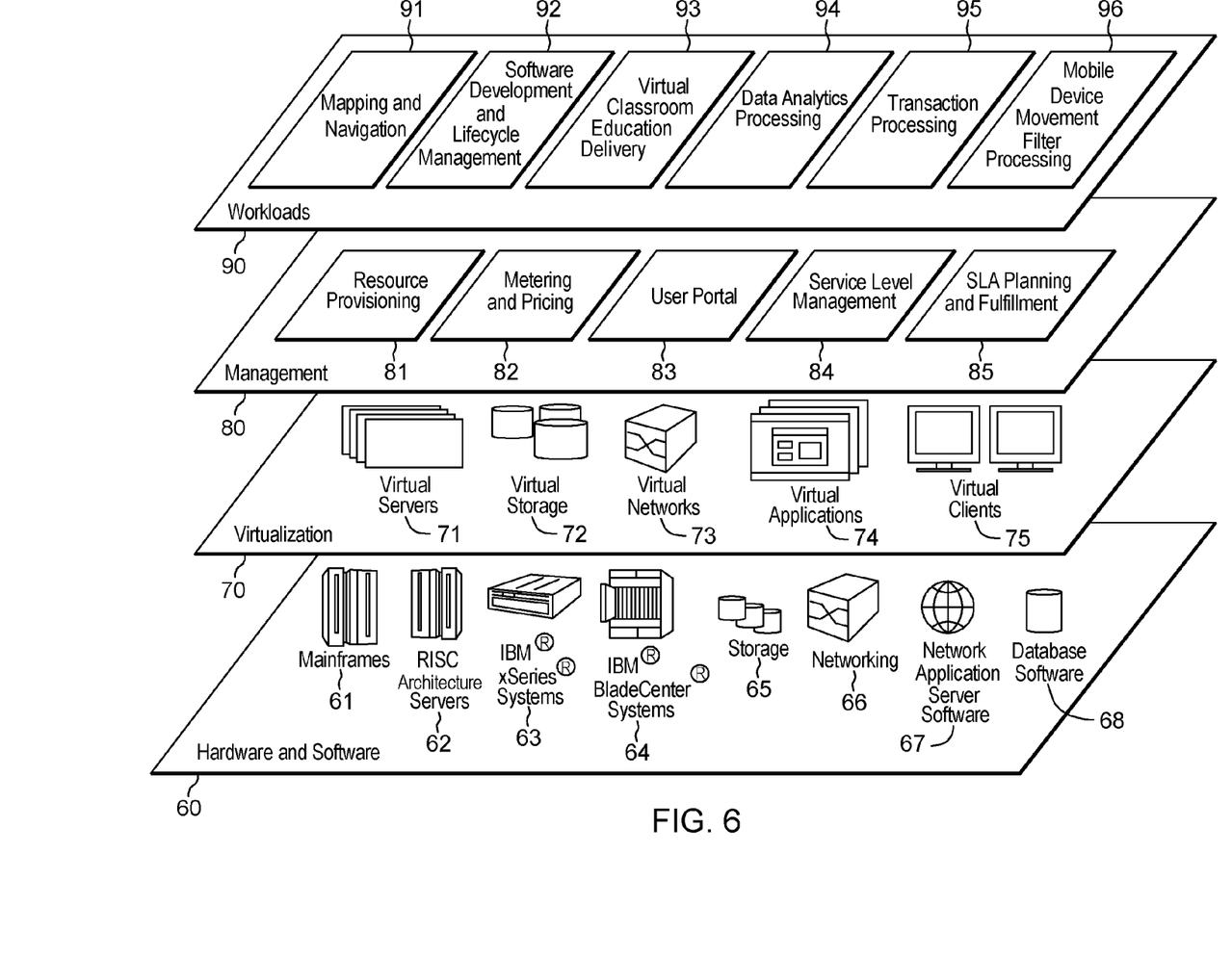
FIG. 6 depicts an example of extraction model layers, which may facilitate implementing mobile device movement filter processing, in accordance with one or more aspects of the present invention.

Referring to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized.

Examples of workloads and functions which may be provided from this layer include: mapping and navigation 91; software development and lifecycle management 92; virtual classroom education delivery 93; data analytics processing 94; transaction processing 95; and mobile device movement filtering processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer-implemented method comprising:
obtaining movement data of multiple mobile devices within a venue, including obtaining time related data associated with the movements of the multiple mobile devices within the venue, the time-related data being selected from a group consisting of: times of day associated with movements of the multiple mobile devices within the venue and dwell times associated with movements of the multiple mobile devices within the venue;
receiving a specified movement pattern of interest through the venue, the specified movement pattern of interest being a venue-specified movement pattern of interest;
comparing, by a processor, the movement data of the multiple mobile devices within the venue against the specified movement pattern of interest through the venue; and
based on the comparing, generating for the venue a data structure at least identifying one or more mobile devices of the multiple mobile devices with movement data within the venue closest to the specified movement pattern of interest through the venue.

2. The computer-implemented method of claim 1, wherein the venue-specified movement pattern is specified via a display interface to a system facilitating performing the computer-implemented method.

3. The computer-implemented method of claim 1, wherein the specified movement pattern of interest comprises a venue-specified travel path through the venue, or a venue-specified pattern of zone movements through the venue.

4. The computer-implemented method of claim 1, further comprising displaying a map including the specified movement pattern of interest and also at least part of the obtained movement data of the multiple mobile devices within the venue.

5. The computer-implemented method of claim 1, further comprising displaying a map including the specified movement pattern of interest and also the movement data of the one or more mobile devices within the venue.

6. The computer-implemented method of claim 1, wherein the generating comprises including within the data structure any mobile device of the multiple mobile devices with movement data matching the specified movement pattern of interest through the venue within a set tolerance.

7. The computer-implemented method of claim 1, wherein the generating includes prioritizing within the data structure the one or more mobile devices based on closeness of the respective movement data to the specified movement pattern of interest within the venue.

8. A system comprising;
a memory; and
a processing unit communicatively coupled to the memory, wherein the system performs a method comprising:
obtaining movement data of multiple mobile devices within a venue, including obtaining time related data associated with the movements of the multiple mobile devices within the venue, the time-related data being selected from a group consisting of: times of day associated with movements of the multiple mobile devices within the venue and dwell times associated with movements of the multiple mobile devices within the venue;
receiving a specified movement pattern of interest through the venue, the specified movement pattern of interest being a venue-specified movement pattern of interest;
comparing, by a processor, the movement data of the multiple mobile devices within the venue against the specified movement pattern of interest through the venue; and
based on the comparing, generating for the venue a data structure at least identifying one or more mobile devices of the multiple mobile devices with movement data within the venue closest to the specified movement pattern of interest through the venue.

9. The system of claim 8, wherein the venue-specified movement pattern is specified via a display interface of the system.

10. The system of claim 8, wherein the specified movement data pattern of interest comprises a venue-specified travel path through the venue, or a venue-specified pattern of zone movements through the venue.

11. The system of claim 8, further comprising a display showing a map including the specified movement pattern of interest and at least part of the obtained movement data of the multiple mobile devices within the venue.

12. They system of claim 8, wherein the generating comprises including within the data structure any mobile device of the multiple mobile devices with movement data matching the specified movement pattern of interest through the venue within a set tolerance.

13. They system of claim 8, wherein the generating includes prioritizing within the data structure the one or more mobile devices based on closeness of the respective movement data to the specified movement pattern of interest within the venue.

14. A computer program product for filtering mobile device movement data, the computer-program product comprising:
- a computer readable storage medium having computer readable program code embodied therewith, the computer readable program code being executable by a processor to perform a method comprising:
  - obtaining movement data of multiple mobile devices within a venue, including obtaining time related data associated with the movements of the multiple mobile devices within the venue, the time-related data being selected from a group consisting of: times of day associated with movements of the multiple mobile devices within the venue and dwell times associated with movements of the multiple mobile devices within the venue;
  - receiving a specified movement pattern of interest through the venue, the specified movement pattern of interest being a venue-specified movement pattern of interest;
  - comparing, by a processor, the movement data of the multiple mobile devices within the venue against the specified movement pattern of interest through the venue; and
  - based on the comparing, generating for the venue a data structure at least identifying one or more mobile devices of the multiple mobile devices with movement data within the venue closest to the specified movement pattern of interest through the venue.

\* \* \* \* \*